(12) United States Patent
Daugherty

(10) Patent No.: US 6,349,946 B1
(45) Date of Patent: Feb. 26, 2002

(54) LARGE HOLE SEALING MEMBER AND TEMPLATE

(76) Inventor: John K Daugherty, 713 Apollo Dr., Joliet, IL (US) 60435

( * ) Notice: Subject to any disclaimer, the term of this patent is extended or adjusted under 35 U.S.C. 154(b) by 0 days.

(21) Appl. No.: 09/400,342

(22) Filed: Sep. 20, 1999

Related U.S. Application Data

(63) Continuation-in-part of application No. 09/262,641, filed on Mar. 4, 1999, now abandoned, which is a continuation of application No. 08/880,195, filed on Mar. 27, 1997, now abandoned.

(51) Int. Cl.$^7$ ................................................. F16J 15/02
(52) U.S. Cl. ........................ 277/606; 277/626; 277/630; 277/642; 277/647
(58) Field of Search .................................. 277/606, 626, 277/641, 642, 647, 630; 16/2.1, 2.2, 108; 174/65 G, 152 G, 153 G; 285/921, 215, 216, 140.1

(56) References Cited

U.S. PATENT DOCUMENTS

| | | | | |
|---|---|---|---|---|
| 2,039,009 A | * | 4/1936 | Lampman et al. | |
| 3,245,428 A | * | 4/1966 | Klimak et al. | |
| 3,445,121 A | * | 5/1969 | Lineker | |
| 3,490,791 A | * | 1/1970 | Mitchell | |
| 3,819,118 A | * | 6/1974 | Brock et al. | |
| 4,232,421 A | * | 11/1980 | Tucker | |
| 4,416,478 A | * | 11/1983 | Canney | |
| 4,589,690 A | * | 5/1986 | Meuleman | |
| 4,663,036 A | * | 5/1987 | Strobl, Jr. et al. | |
| 4,905,940 A | * | 3/1990 | Luka | |
| 5,003,130 A | * | 3/1991 | Danforth et al. | |
| 5,071,143 A | * | 12/1991 | Byerly et al. | |
| 5,941,532 A | * | 8/1999 | Flaherty et al. | |

* cited by examiner

Primary Examiner—Anthony Knight
Assistant Examiner—John L. Beres
(74) Attorney, Agent, or Firm—Ernest Kettelson

(57) ABSTRACT

A sealing member to seal the opening in the side wall of a chamber such as a catch basin through which a laterally extending member such as a drain pipe is positioned and connected. The sealing gasket comprises an annular ring having a cylindrical bore to receive such drain pipe for example, an annular groove cut into the annular ring which divides the portions adjacent the groove into a first annual flange on one side of the groove and a second annular flange on the opposite side of the groove. The sealing gasket is made of a flexible compressible material. It is worked into the opening to be sealed by flexing the gasket in such a way as to insert the peripheral edge of the wall surrounding the opening into the annular groove, whereupon one of the annular flanges is in sealing bearing relationship against the outer surface of the wall around the opening and the other annular flange is in sealing bearing relationship against the inner surface thereof. The drain pipe or other item is then moved into and through the cylindrical bore of the gasket in a tight fit far enough to extend a short distance into the chamber.

18 Claims, 3 Drawing Sheets

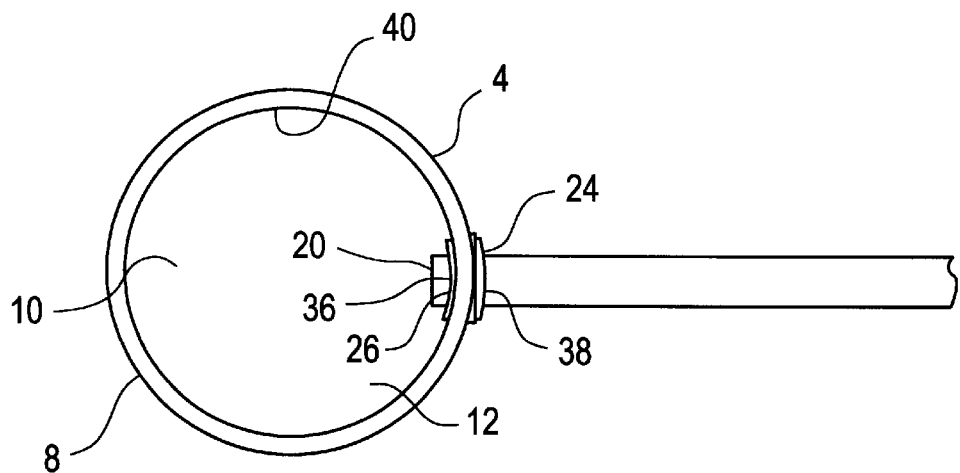
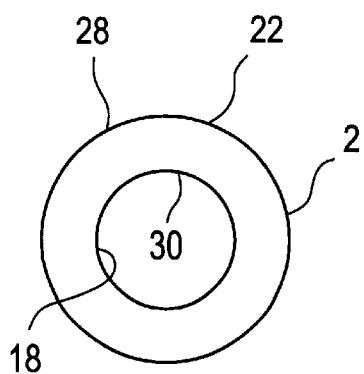
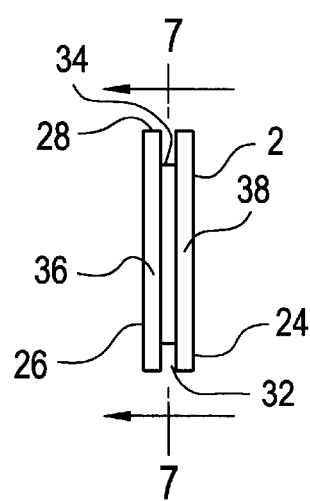

FIG. 7
FIG. 8
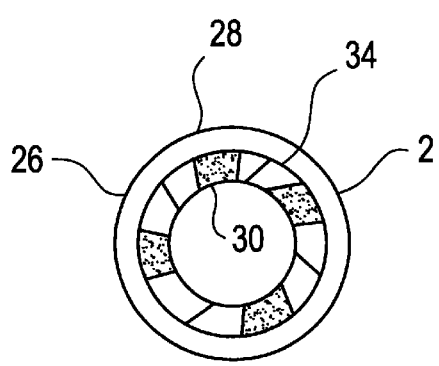
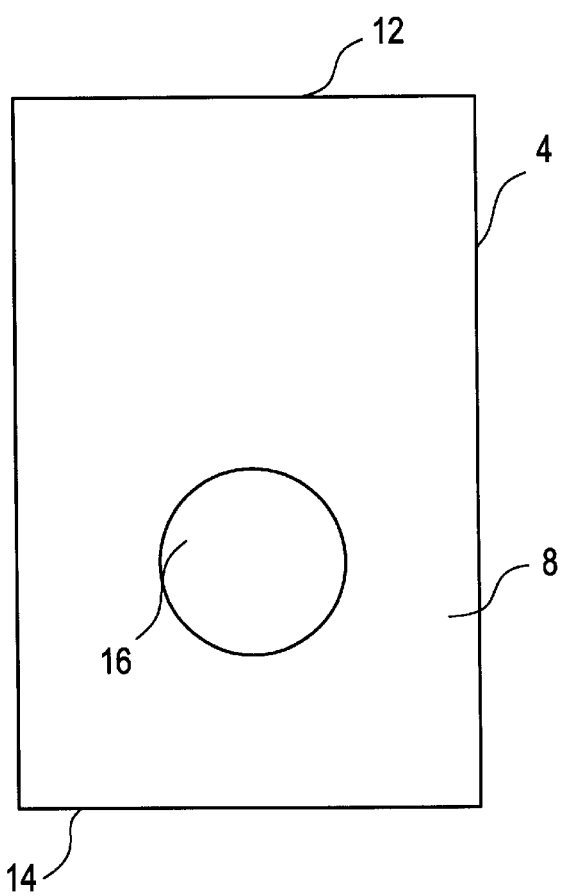
FIG. 9
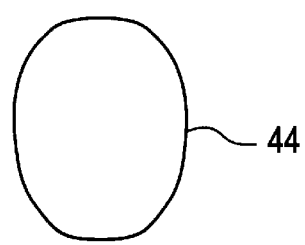

LARGE HOLE SEALING MEMBER AND TEMPLATE

RELATED APPLICATIONS

This application is a continuation-in-part of application Ser. No. 09/262,641 filed Mar. 4, 1999, now abandoned, which is a continuation of application Ser. No. 08/880,195 filed Mar. 27, 1997, now abandoned.

FIELD OF THE INVENTION

This invention relates to the field of sealing members, and in particular those which are able to seal the large opening in a catch basin through which a relatively large diameter drain pipe enters the catch basin, for example, or through which any kind of a relatively large diameter elongated member enters a chamber of some kind which has to be sealed against leakage. The opening in the catch basin ranges from about five inches in diameter to receive a drain pipe of about four and a quarter inch outer diameter to about nine and a half inch opening to receive a drain pipe of about eight and a half inch outer diameter.

BACKGROUND OF THE INVENTION

Prior art items in this field of which the inventor is aware include those disclosed in the following United States patents:

U.S. Pat. No. 5,529,312 Issued Jun. 25, 1996
U.S. Pat. No. 5,286,040 Issued Feb. 15, 1994
U.S. Pat. No. 5,071,143 Issued Dec. 10, 1991
U.S. Pat. No. 4,905,940 Issued Mar. 6, 1990
U.S. Pat. No. 4,903,970 Issued Feb. 27, 1990
U.S. Pat. No. 4,663,036 Issued May 5, 1987
U.S. Pat. No. 4,478,437 Issued Oct. 23, 1984
U.S. Pat. No. 4,297,780 Issued Nov. 3, 1981
U.S. Pat. No. 4,215,868 Issued Aug. 5, 1980
U.S. Pat. No. 4,203,190 Issued May 20, 1980
U.S. Pat. No. 3,540,747 Issued Nov. 17, 1970
U.S. Pat. No. 3,445,121 Issued May 20, 1969
U.S. Pat. No. 2,039,009 Issued Apr. 28, 1936

The foregoing patents are in the public domain available to the public at large and anyone having an interest in the subject matter with which the present invention is concerned.

SUMMARY OF THE INVENTION

The present invention provides a number of improvements over the prior art in this field. The present invention is particularly beneficial for use in such things as golf course construction and other construction projects wherein a number of catch basins have to be installed to which relatively large diameter drain pipes are connected to provide proper drainage. The typical drain pipe ranges in diameter from about four and a quarter inches up to about eight and a half inches. The openings in the catch basin have a correspondingly large diameter ranging from about five inches up to about nine and a half inches. The sealing members to seal such large diameter openings therefore have to be correspondingly larger diameter than any similar kind of sealing member known to the prior art.

A typical catch basin consists of a cylindrical member about two or three feet long to be installed vertically in the ground with its open top wall even with ground level covered by a grate or lid. The bottom wall opening of the cylindrical catch basin is closed by cement or the like. Laterally extending drain pipes below ground level are connected to the catch basin at a level about six or seven inches above its lower edge, through circular apertures cut through the cylindrical side wall of the catch basin. Such apertures have to be sealed to prevent water in the catch basin from seeping back out.

The sealing gaskets in accordance with the present invention comprise an annular ring member having a central cylindrical bore whose diameter corresponds to that of the drain pipe to be connected to the catch basin. The annular ring member is preferably about three-fourths of an inch thick or three-fourths of an inch in lateral dimension from one side wall to the other. An annular groove is cut around the annular member midway between its side walls, having a groove width of about three-eighths of an inch to about a half-inch to snugly receive therein the peripheral edge portion of a catch basin cylindrical wall about three-eighths to one-half inch thick.

The annular groove divides the annular ring into a pair of annular flanges which will bear against and seal the inner and outer surface of the side wall of the catch basin surrounding the drain pipe entrance hole when the sealing gasket is fully in place.

The annular groove is about three-fourths to seven-eighths of an inch deep, terminating inwardly at an annular groove floor.

The sealing gasket is made of a flexible compressible material such as rubber or a rubberlike compound material. A preferred material is known as 60 Durometer EPDM Jasper MF 6057, which is available from suppliers of gasket material.

To determine the diameter size of the hole to be cut in the cylindrical side wall of the catch basin, a template is provided which defines a circle having a diameter corresponding to the diameter of the annular groove floor of the groove cut in the annular ring. When the hole of such diameter is cut in the side wall of the catch basin, the flexible compressive annular ring is worked into the hole, inserting the peripheral wall edge around the hole into the annular groove until fully seated therein to abut against the annular groove floor. At such time, one of the annular flanges is in sealing bearing relationship against the outer surface of the catch basin wall surrounding the drain pipe entrance hole, and the other annular flange is in sealing bearing relationship against the inner surface thereof.

When, the sealing gasket is in place around the drain pipe entrance hole, the end of the drain pipe to be inserted is positioned to enter the cylindrical bore of the sealing gasket. Such end of the drain pipe is preferably bevelled to facilitate entry. The drain pipe should be pushed through the cylindrical bore of the sealing gasket by hand preferably, so as to prevent rolling of the gasket. When the drain pipe has been pushed through the central bore of the gasket and begins to protrude into the cavity of the catch basin, a pipe bar can then be used to force the pipe further into the catch basin until it extends therein about one inch.

The sealing gasket in accordance with this invention may thus be easily and quickly installed to seal the opening through which drain pipes are connected to a catch basin. Other applications and uses of this sealing gasket may also be made, whenever it is necessary to seal the opening through which an elongated member extends into a chamber having a fluid therein which could otherwise leak out were it not for such seal.

Other advantages and improvements provided by the sealing gasket in accordance with this invention will become

BRIEF DESCRIPTION OF THE DRAWINGS

FIG. 4 is a top plan view of a catch basin with a drain pipe connected thereto and with a sealing member in place.

FIG. 5 is a side elevation view of a sealing member in accordance with this invention.

FIG. 6 is an end elevation view of the sealing member shown in FIG. 5.

FIG. 7 is a section view of the sealing member taken on line 7—7 of FIG. 6.

FIG. 8 is a side elevation view of a catch basin without a drain pipe connected thereto to show its circular opening the drain pipe is to be received through.

FIG. 9 is a plan view of a continuously arcuate template having a peripheral dimension corresponding to the peripheral or circumferential dimension of the groove floor of a sealing member in accordance with this invention which has been selected for use with a drain pipe of a given diameter that is to be connected to the catch basin.

DESCRIPTION OF PREFERRED EMBODIMENT

Figure 1:
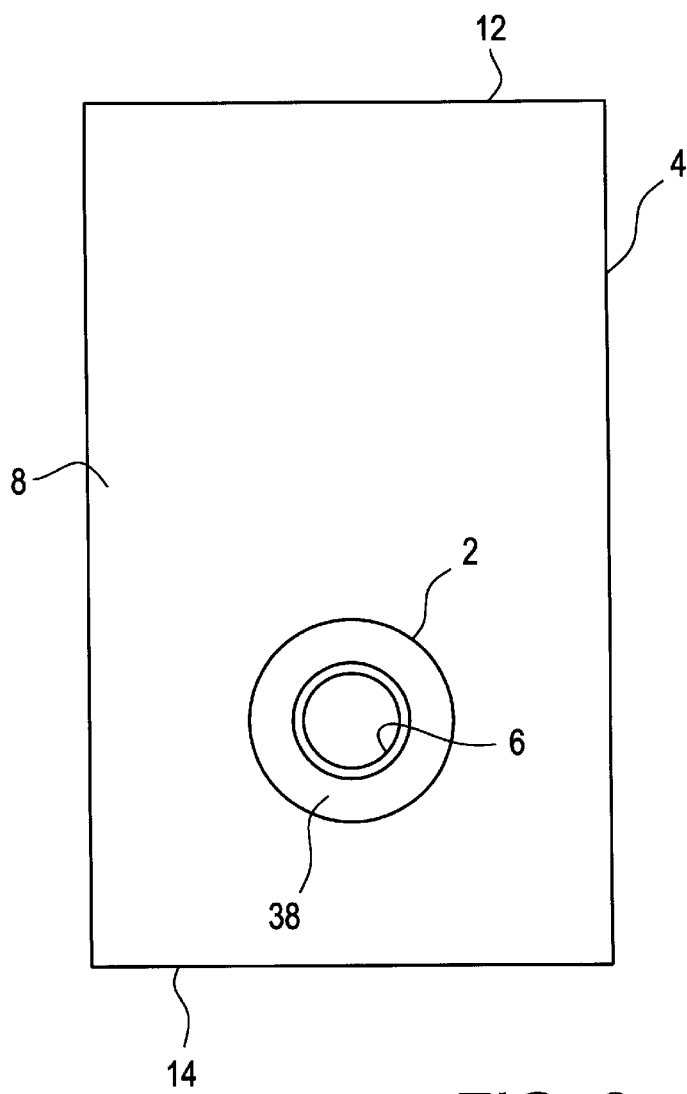
FIG. 1 is a side elevation view of catch basin having a drain pipe connected thereto with a sealing member in accordance with this invention in place to seal the aperture leading into the catch basin.
Figure 2:
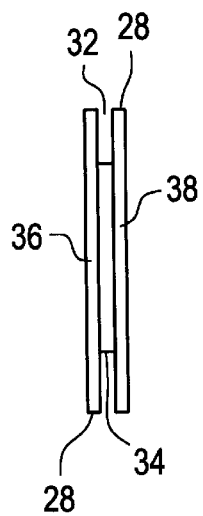
FIG. 2 is an end elevation view of a sealing member in accordance with this invention.
Figure 3:
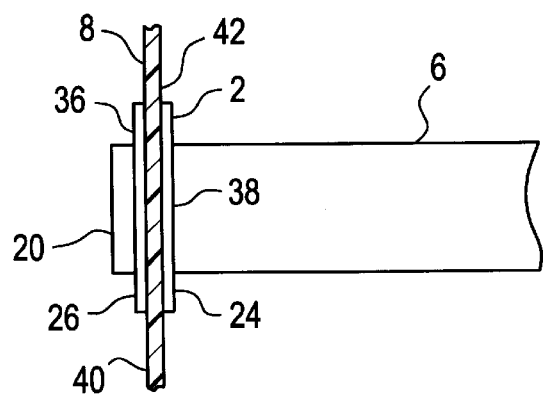
FIG. 3 is a side elevation view of a drain pipe, a portion of which is broken away, extending through the aperture in the catch basin side wall (shown in section) and showing the position of the sealing member flanges bearing against the inner and outer surfaces of the catch basin side wall.

A sealing gasket 2 in accordance with the present invention is provided to seal and prevent leakage at the entrance to a catch basin 4 that receives a laterally extending drain pipe 6.

The catch basin 4 comprises a relatively large diameter cylindrical side wall 8 around a cylindrical cavity 10. A typical catch basin may have a cylindrical wall about three feet long and an outer diameter of about twelve to thirteen inches. The cylindrical wall 8 is typically about a half inch thick. However the size and dimensions of the catch basin may vary from those indicated, both smaller and larger. The sealing gasket 2 in accordance with this invention may be adapted for use with any size catch basin 4 and with any size drain pipe 6 received in the entrance to such catch basin.

The catch basin 4 is placed in an excavation dug in the ground, with its cylindrical wall 8 extending vertically. The upper end wall 12 is open and will be covered by a lid or grate. The catch basin 4 is put into the ground far enough so its open upper end wall 12 is substantially at ground level. The lower end wall 14 of the catch basin 4 is typically closed by cement or other solid material.

One or more drain pipes 6 are connected to the catch basin 4 through a respective circular aperture 16 formed in the cylindrical side wall 8 of the catch basin.

The diametric dimension of the circular aperture 16 to receive a drain pipe 6 of a given diameter is determined as explained and described hereinbelow.

The diameter of circular aperture 16 is relatively large, from about five inches in diameter to receive smaller drain pipes 6 having an outer diameter of about four and a quarter inches up to nine and a half inches in diameter to receive larger drain pipes 6 having an outer diameter of about eight and a half inches.

A sealing gasket 2 is selected which has an internal diameter of its central cylindrical bore 18 that corresponds to the outer diameter of the drain pipe 6 to provide a tight fit when the insertable end 20 is received through the bore 18 of the sealing gasket 2.

The inner diameter of the central cylindrical bore 18 of the sealing gasket 2 to seat in and seal a circular aperture 16 having a five inch diameter is substantially four and a quarter inches, and its outer diameter is substantially six inches. The diameter of its annular groove floor 34 is no less than five inches and slightly larger to bear tightly against and around the circumferential edge of the five inch diameter circular aperture 16. The inner diameter of the central cylindrical bore 18 of the sealing gasket 2 to seat in and seal a circular aperture 16 having a nine and a half inch diameter is substantially eight and a half inches, and its outer diameter is substantially ten and a half inches. The diameter of its annular groove floor 34 is no less than nine and a half inches and slightly larger to bear tightly against and around the circumferential edge of the nine and a half inch diameter circular aperture 16.

The sealing gasket 2 is made of a flexible compressive material such as rubber or similar material having rubberlike characteristics of flexibility and being compressible. A preferred material is one known as 60 Durometer EPDM Jasper MF 6057, available from gasket material suppliers. The term "60 Durometer" refers to hardness of the material. The letters "EPDM" refers to Ethylene Propylene Diene Monomer which is a thermoplastic rubber with superior tear strength.

The sealing gasket 2 comprises an annular ring member 22 surrounding the cylindrical bore 18, having a rearwardly facing annular side wall 24 and a forwardly facing annular side wall 26. The annular ring member 22 also includes an outwardly facing circumferential wall 28 and an inwardly facing circumferential wall 30 each extending from annular side wall 24 to annular side wall 26.

The rearwardly facing annular side wall 24 and forwardly facing annular side wall 26 each have the same dimension throughout measured between the outwardly facing circumferential wall 28 and the inner circumferential wall 30.

An annular groove 32 is cut in the annular ring member 22 at the midpoint between annular side walls 24 and 26, extending inwardly from outwardly facing circumferential wall 28 to terminate at an annular groove floor 34. The width of the annular groove 32 is less than the thickness of the cylindrical side wall 8 of the catch basin 4 with which the sealing gasket 2 is to be used but wide enough so when compressive force is applied the cylindrical wall 8 can be received in the groove 32 to thereby provide a seal around the circular aperture 16 when the sealing gasket 2 is in place. If the thickness of the cylindrical wall 8 is one half inch, an appropriate corresponding width of annular groove 32 would be about three eighths of an inch to about one-half inch.

The radial dimension of the annular ring member 22 between its outwardly facing circumferential wall 28 and its inwardly facing circumferential wall 30 is preferably about one and one-eighth inches to about one and one fourth inches. The radial dimension of the annular groove 32 from its annular groove floor 34 to the outwardly facing circumferential wall 28 of the ring member 22 is about three-fourths of an inch. That leaves a solid annular portion of the annular ring member 22 between the annular groove floor 34 and the inwardly facing circumferential wall 30 of about three-eighths to one-half inch.

In a preferred embodiment and by way of example, the lateral dimension of the sealing gasket 2 between annular side walls 24 and 26 is about three-fourths of an inch to one inch.

The annular groove 32 divides the annular ring member 22 into a pair of spaced apart annular flanges, including inner flange 36 and outer flange 38 which extend radially outward from the annular groove floor 34 to the outwardly facing circumferential wall 28 of the annular ring member 22 the aforesaid distance of about three-fourths of an inch. Thus, when sealing member 2 is in place around the circular aperture 16 of the catch basin 4 with its cylindrical side wall 8 received in the annular groove 32 of the annular ring member 22, the inner flange 36 provides an annular sealing surface around and tightly against the inner surface 40 of the catch basin cylindrical side wall 8 having a radial dimension of about three-fourths of an inch therearound. The outer flange 38 provides an annular sealing surface around and tightly against the outer surface 42 of the catch basin cylindrical side wall 8 having a radial dimension of about three-fourths of an inch therearound.

The annular flanges 36 and 38 in accordance with this invention have a radial dimension between annular groove floor 34 and the outwardly facing circumferential wall 28 that is greater than the width or lateral dimension of the annular groove 32.

In the example set forth above wherein the width or lateral dimension of the annular groove 32 may be about three-eighths of an inch and the radial dimension of the annular flanges 36 and 38 is about three-fourths of an inch, the radial dimension of the annular flanges is two times greater than the width or lateral dimensions of the annular groove 32.

A sealing gasket 2 is selected for a drain pipe 6 wherein the diameter of the central bore 18 of such gasket corresponds to the external diameter of the drain pipe 6 for a tight fit reception of the drain pipe in the bore 18.

A circular aperture 16 is then cut through the cylindrical side wall 8 of the catch basin having a diameter which corresponds in dimension to the diameter of the annular groove floor 34, so when the annular edge portions of such side wall 8 around the circular aperture 16 are received in the annular groove 32 they closely approach the annular groove floor 34 therearound.

Each different size sealing gasket 2 may have a template 44 with a diameter corresponding to the diameter of its annular groove floor 34. The template must be slightly ovular in shape when flat in order to form a perfect circle matching that of the annular groove floor 34 when the template is pressed against the cylindrical side wall of the catch basin. Such template can then be used to trace on the cylindrical side wall 8 of the catch basin the circular opening 16 that is to be cut therein.

When the circular aperture 16 has been cut in the cylindrical wall 8, the sealing gasket 2 is then worked into such aperture by seating the edges around the aperture 16 in the annular groove 32 of the sealing gasket 2 until fully received therein. After the sealing gasket 2 is in place around the circular aperture 16, the insertable end of the drain pipe 6 is preferably beveled and then inserted into the central bore 18 of the sealing gasket 2. The beveled inserted end of the drain pipe 6 should be fully inserted in the passageway of the central bore 18 by hand and with care to prevent the sealing gasket from rotating relative to the aperture 16. Once the drain pipe 6 has been inserted far enough to begin to emerge from the inwardly facing opening of the gasket bore 18, the tight fit of the drain pipe 6 in the bore 18 compresses the annular ring member 22 outwardly a sufficient amount for the annular groove floor 34 to begin to bear against and compress against the annular edge portion of the circular aperture 6 received in the annular groove 32. The sealing gasket 2 will thus be held against rotation and rolling. A pipe bar or other appropriate tool may then be used to force the drain pipe 6 through the sealing gasket bore 18 a further distance until it reaches the desired length into the cavity of the catch basin.

I claim:

1. An annular sealing device for sealing the aperture of a structure wall through which an elongated member is slidingly received, and template in combination, said annular sealing device comprising an annular member surrounding an annular passageway having a diameter no less than four and a quarter inches through said sealing device and having a circumferential edge therearound to slidingly receive said elongated member therethrough, said annular member including first sealing means extending radially outward of said annular member, second sealing means extending radially outward of said annular member spaced apart from and substantially parallel to said first sealing means, an annular receiving groove between said first and second sealing means, said annular receiving groove having an annular groove floor extending along and around the bottom of said groove, said receiving groove having a lateral dimension not less than one-fourth of an inch, said structure wall around said aperture therethrough having a cross-sectional dimension no less than one-fourth of an inch to be received snugly in said receiving groove, said first and second spaced apart sealing means each including a shape retaining wall portion when unflexed which extends radially outward of said groove floor a distance not less than one-half of an inch, said template having a circumferential configuration slightly ovular when flat and circular when pressed against said cylindrical side wall of said cylindrical structure and a circumferential dimension corresponding to that of said annular groove floor for placement against said tubular side wall of said tubular structure and for marking the said circumferential dimension and configuration of said template thereon to define a hole which has a circumferential dimension and configuration corresponding to that of said annular groove floor.

2. An annular sealing device for sealing the aperture of a structure through which an elongated member is received and template in combination as set forth in claim 1, wherein said first sealing means comprises a first annular flange and said second sealing means comprises a second annular flange, at least one of said first and second annular flanges having an outwardly facing wall with a radial dimension not less than one inch, each of said annular flanges having an inner and outer circumferential edge and the same uniform dimension throughout between said inner and outer circumferential edges.

3. An annular sealing device for sealing the aperture of a structure through which an elongated member is received and template in combination as set forth in claim 2, wherein said annular passageway through said sealing gasket comprises a cylindrical bore.

4. An annular sealing device for sealing the aperture of a structure through which an elongated member is received and template in combination as set forth in claim 3, wherein said lateral dimension of said receiving groove is about three-eighths of an inch and at least one of said first and second annular flanges extends radially outward of said groove floor a distance of at least about three-fourths of an inch.

5. An annular sealing device for sealing the aperture of a structure through which an elongated member is received and template in combination as set forth in claim 4, wherein both of said first and second annular flanges extend radially outward of said groove floor a distance of at least about three-fourths of an inch.

6. An annular sealing device for sealing the aperture of a structure through which an elongated member is received and template in combination as set forth in claim 1, wherein said annular member is made of a flexible compressible material identified as 60 Durometer EPDM Jasper MF 6057.

7. An annular sealing device in combination with a catch basin and a drain pipe connected thereto and template in combination, said catch basin having a vertically extending side wall, said vertically extending side wall having a cross-sectional thickness no less than one-fourth of an inch, a drain pipe receiving aperture through said side wall having an annular configuration, said annular sealing device comprising an annular member having first sealing means extending radially outward of said annular member, second sealing means extending radially outward of said annular member spaced apart from and substantially parallel to said first sealing means, an annular receiving groove between said first and second sealing means, said receiving groove having an annular groove floor extending along the bottom of said groove, said receiving groove having a lateral dimension not less than one-fourth of an inch, said drain pipe receiving aperture having an annular peripheral sealing device seating edge portion therearound having a cross-sectional dimension not less than one-fourth of an inch, said peripheral sealing device edge portion of said drain pipe receiving aperture being received in said receiving groove of said annular member, said annular member having an annular cylindrical passageway therethrough, said annular cylindrical passageway having a diameter not less than four and a quarter inches, said drain pipe being slidingly received through said annular cylindrical passageway in a tight fit, said first sealing means having a first shape retaining wall portion when unflexed in bearing and sealing relationship against one side of said side wall of said basin around said drain pipe receiving aperture, said second sealing means having a second shape retaining wall portion when unflexed in bearing and sealing relationship against the opposite side of said side wall of said catch basin around said drain pipe receiving aperture, said first and second wall portions of said first and second sealing means each extending outward of said groove floor a distance not less than one-half of an inch, said template having a circumferential configuration slightly ovular when flat and circular when pressed against said cylindrical side wall of said cylindrical structure and a circumferential dimension corresponding to that of said annular groove floor for placement against said tubular side wall of said tubular structure and for marking the said circumferential dimension and configuration of said template thereon to define a hole which has a circumferential dimension and configuration corresponding to that of said annular groove floor.

8. An annular sealing device in combination with a catch basin and a drain pipe connected thereto and template as set forth in claim 7, wherein said first sealing means comprises a first annular flange which includes said first wall portion of said first sealing means and said second sealing means comprises a second annular flange which includes said second wall portion of said second sealing means, at least one of said first and second annular flanges having an outwardly facing wall with a radial dimension not less than one inch.

9. An annular sealing device in combination with a catch basin and a drain pipe connected thereto and template as set forth in claim 8, wherein said lateral dimension or thickness of said side wall of said catch basis is about one-half inch, said lateral dimension of said receiving groove is about three-eighths of an inch, at least one of said first and second annular flanges extend radially outward of said groove floor a distance of at least about three-fourths of an inch.

10. An annular sealing device in combination with a catch basin and a drain pipe connected thereto and template as set forth in claim 9, wherein both of said first and second annular flanges extend radially outward of said groove floor a distance of at least about three-fourths of an inch.

11. An annular sealing device and template in combination, said sealing device comprising an annular member, a cylindrical passageway therethrough to slidingly receive an elongated member therethrough, said cylindrical passageway having a diameter not less than four and a half inches, first sealing means extending radially outward of said annular member, second sealing means extending radially outward of said annular member spaced apart from and substantially parallel to said first sealing means, an annular receiving groove between said first and second sealing means, said receiving groove having an annular groove floor extending along the bottom of said groove, said receiving groove having a lateral dimension not less than one-fourth of an inch, said first and second spaced apart sealing means each including a shape retaining wall portion when unflexed which extends radially outward of said groove floor a distance not less than one-half of an inch, wherein said first sealing means includes a first annular flange and said second sealing means includes a second annular flange, at least one of said first and second annular flanges having an outwardly facing wall with a radial dimension not less than one inch.

12. An annular sealing device and template in combination as set forth in claim 11, wherein said passageway through said sealing gasket comprises a cylindrical bore.

13. An annular sealing device and template in combination as set forth in claim 12, wherein said lateral dimension of said receiving groove is about three-eighths of an inch and at least one of said first and second annular flanges extends radially outward of said groove floor a distance of at least about three-fourths of an inch.

14. An annular sealing device and template in combination as set forth in claim 13, wherein both of said first and second annular flanges extend radially outward of said groove floor a distance of at least about three-fourths of an inch.

15. An annular sealing device and template in combination as set forth in claim 13, wherein said annular member includes an annular side wall having an inner circumferential edge and an outer circumferential edge, the radial dimension of said annular side wall between said inner and outer circumferential edges being at least one inch.

16. An annular sealing device and template in combination as set forth in claim 13, wherein said annular member includes a first annular side wall facing in one direction, a second annular side wall spaced apart from said first annular side wall and facing in the opposite direction, said first annular side wall having an inner circumferential edge and an outer circumferential edge, the lateral dimension between said first and second annular side walls being greater than one-half inch.

17. A sealing assembly for a tubular structure having a tubular side wall with a hole having a diameter not less than five inches therethrough to receive an elongated tubular member, said sealing assembly comprising an annular sealing member and template in combination, said annular sealing member surrounding an annular passageway therethrough, said annular sealing member having an annular groove, said annular groove having a lateral dimension corresponding to the thickness of said tubular side wall of said tubular structure, a first annular flange on one side of said annular groove, a second annular flange on the opposite side of said annular groove, said annular groove having an annular groove floor, said annular groove floor having a selected circumferential configuration and a dimension to surround a diameter not less than five inches, said template having a circumferential configuration and dimension corresponding to that of said annular groove floor for placement against said tubular side wall of said tubular structure and for marking the said circumferential dimension and configuration of said template thereon to define a hole which has a circumferential dimension and configuration corresponding to that of said annular groove floor, said passageway through said annular sealing gasket having a configuration and dimension corresponding to the cross-sectional configuration and dimension of said elongated tubular member to be received therethrough and through said tubular side wall of said tubular structure.

18. A sealing assembly comprising an annular sealing member and template in combination for a tubular structure having a tubular side wall with a hole having a diameter not less than five inches therethrough to receive an elongated tubular member as set forth in claim 17, wherein said tubular structure is a cylindrical structure and said tubular side wall is cylindrical side wall, wherein said template is slightly ovular when flat and circular when pressed against said cylindrical side wall of said cylindrical structure.

* * * * *